United States Patent
Aston et al.

(10) Patent No.: US 10,087,970 B2
(45) Date of Patent: Oct. 2, 2018

(54) SEALANT CONTAINMENT ASSEMBLY

(71) Applicant: The Boeing Company, Chicago, IL (US)

(72) Inventors: Richard W. Aston, Brea, CA (US); Anna M. Tomzynska, Seal Beach, CA (US); Michael J. Langmack, Huntington Beach, CA (US); Jazzmin P. Martinez, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 214 days.

(21) Appl. No.: 15/142,465

(22) Filed: Apr. 29, 2016

(65) Prior Publication Data
US 2017/0314603 A1 Nov. 2, 2017

(51) Int. Cl.
| | |
|---|---|
| *B64C 1/06* | (2006.01) |
| *F16B 33/00* | (2006.01) |
| *B64C 3/26* | (2006.01) |
| *B64D 45/02* | (2006.01) |
| *B29C 39/10* | (2006.01) |
| *B64F 5/10* | (2017.01) |

(52) U.S. Cl.
CPC ............ *F16B 33/004* (2013.01); *B29C 39/10* (2013.01); *B64C 3/26* (2013.01); *B64D 45/02* (2013.01); *B64F 5/10* (2017.01)

(58) Field of Classification Search
CPC .. B64C 3/26; B64C 1/26; B64D 45/02; B64F 5/10; B29C 39/10; F16B 33/004
See application file for complete search history.

(56) References Cited

U.S. PATENT DOCUMENTS

| | | | |
|---|---|---|---|
| 3,543,719 | A | 12/1970 | Pettyjohn |
| 4,404,054 | A | 9/1983 | Dickson et al. |
| 7,837,148 | B2 | 11/2010 | Kismarton et al. |
| 7,887,009 | B2 | 2/2011 | Keeler, Jr. et al. |

(Continued)

FOREIGN PATENT DOCUMENTS

EP 0181483 A1 5/1986

OTHER PUBLICATIONS

Search Report for related European Application No. EP17155364.7; report dated Jul. 25, 2017.

*Primary Examiner* — Philip J Bonzell
(74) *Attorney, Agent, or Firm* — Miller, Matthias & Hull LLP

(57) ABSTRACT

A sealant containment assembly for enclosing fasteners disposed within a confined space. The sealant containment assembly includes a first containment member and a second containment member that extend between two surfaces. The first and second containment members each include structure-engaging ends for engaging a structural member and the first and second containment members each include enclosure ends that connect the first and second containment members together to enclose the fasteners within a confined space defined by the first and second containment members, the first and second surfaces, the structural member and the connected enclosure ends. The assembly also includes at least one injection port disposed outside of the confined space but is in communication with at least one distribution port disposed inside the confined space for filling the confined space with sealant, thereby embedding the fasteners in sealant.

20 Claims, 2 Drawing Sheets

(56) References Cited

U.S. PATENT DOCUMENTS

| | | |
|---|---|---|
| 8,993,097 B2 | 3/2015 | Kwon et al. |
| 9,259,865 B2 * | 2/2016 | Coffland ................. B29C 39/10 |
| 2014/0261994 A1 | 9/2014 | Coffland et al. |
| 2015/0041589 A1 | 2/2015 | Hasan et al. |
| 2016/0136857 A1 * | 5/2016 | Coffland ................. B29C 39/10 425/500 |

* cited by examiner

SEALANT CONTAINMENT ASSEMBLY

BACKGROUND

Technical Field

This disclosure relates to apparatuses and methods for embedding, encasing, encapsulating or covering fasteners in sealant, wherein the fasteners are disposed within a confined space.

Description of the Related Art

A typical aircraft wing assembly includes a central wing box and wings cantilevered from opposing sides of the wing box by "side of body joints." The wings typically include interior spaces that serve as fuel tanks. Some of the metal fasteners that connect the outer skin of the wings to the central wing box or to the side of body joints also extend into the fuel tanks. To prevent an electrical discharge within such a fuel tank in the case of a lightning strike against the outer skin, aircraft manufacturers embed the portions of the fasteners that extend from the skin into the tank in an electrically insulating material or insulating sealant. However, because of the confined space in which the fasteners are disposed, embedding the portions of such fasteners that extend into the fuel tanks is problematic, labor intensive and often requires filling large portions of the side of body joints with insulating sealant, resulting in substantial added weight and increased fuel consumption.

Further, to reduce weight, composite materials are replacing metal as the material of construction of various aircraft components and structures, including the outer skin. Often, raw or uncoated edges of composite structures may be disposed in a confined space used to accommodate fuel. Because composite materials are conductive, any such raw edges also require insulation with a sealant, which is problematic because of the confined space.

Accordingly, a need exists for an improved device and method for embedding, covering, encasing or encapsulating fasteners, portions of fasteners and other structural elements that extend into confined spaces. This need applies to the aircraft industry and other industries as well.

SUMMARY OF THE DISCLOSURE

In one disclosed embodiment, a sealant containment assembly encloses fasteners that extend through a first surface. The first surface is spaced-apart from an opposing second surface and the first and second surfaces engage a structural member. The sealant containment assembly comprises a first containment member that extends between the first and second surfaces and a second containment member that also extends between the first and second surfaces with the fasteners disposed between the first and second containment members. The first and second containment members each comprise a structure-engaging end for engaging the structural member. The first and second containment members also each comprise an enclosure end that couples the first and second containment members together with the fasteners also disposed between the structural member and the connected enclosure ends. As a result, the sealant containment assembly encloses the fasteners within a confined space defined by the first and second containment members, the first and second surfaces, the structural member and the coupled enclosure ends. At least one of the first and second containment members includes at least one injection port disposed outside of the confined space that is in communication with at least one distribution passageway disposed inside the confined space. The distribution passageway comprises at least one distribution port for distributing sealant within the confined space.

Another disclosed embodiment is a sealant containment assembly for fasteners used to secure a wing to a fuselage of an aircraft. The fasteners are disposed between two surfaces disposed inside the wing and between a structural member of the wing and a fuselage of the aircraft. The sealant containment assembly comprises a first containment member that extends between the two surfaces and a second containment member that extends between the two surfaces with the fasteners disposed between the first and second containment members. The first and second containment members each comprise structure-engaging ends for engaging the structural member and enclosure ends coupled by an alignment member that extends between the two surfaces with the fasteners also disposed between the structural member and the alignment member. As a result, the sealant containment assembly encloses the fasteners within a confined space defined by the first and second containment members, the first and second surfaces, the structural member and the alignment member. Further, at least one of the first and second containment members includes at least one injection port disposed outside of the confined space and that is in communication with at least one distribution passageway disposed inside the confined space. The distribution passageway comprises at least one distribution port for distributing sealant within the confined space.

Another disclosed embodiment includes a method for encasing or embedding fasteners in sealant. The fasteners secure a skin of a wing of an aircraft to a side of body chord of the aircraft. The side of body chord includes a first plate and a second plate that extend outward from a wall. The fasteners connect the skin to the first plate with portions of the fasteners disposed between the two plates and between the wall of the side of body chord and a structural member of the wing. The method comprises providing a first containment member configured to extend between the first and second plates and a second containment member also configured to extend between the first and second plates. The first and second containment members each include structure-engaging ends for engaging the structural member of the wing and enclosure ends for connecting the first and second containment members together in a spaced-apart relationship. At least one of the first and second containment members include at least one injection port that is in communication with at least one distribution passageway that comprises at least one distribution port. The method further includes providing an alignment member configured to extend between the first and second plates and further configured to align and connect the enclosure ends of the first and second containment members together. The method further includes connecting the first and second containment members to the alignment member and engaging the structure-engaging ends of the first and second containment members with the structural member to provide a confined space between the first and second containment members, between the first and second plates and between the structural member and the alignment member. Further, the method comprises injecting sealant into the at least one injection port, through the distribution passageway, out through the at least one distribution port and into the confined space.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail in the accompanying drawings, wherein.

The drawings are not necessarily to scale and may illustrate the disclosed embodiment schematically, diagrammatically and/or in partial views. In certain instances, the drawings may omit details which are not necessary for an understanding of the disclosed methods and apparatuses or which render other details difficult to perceive. This disclosure is not limited to the particular embodiment illustrated herein.

DETAILED DESCRIPTION OF THE PRESENTLY PREFERRED EMBODIMENTS

Figure 1:
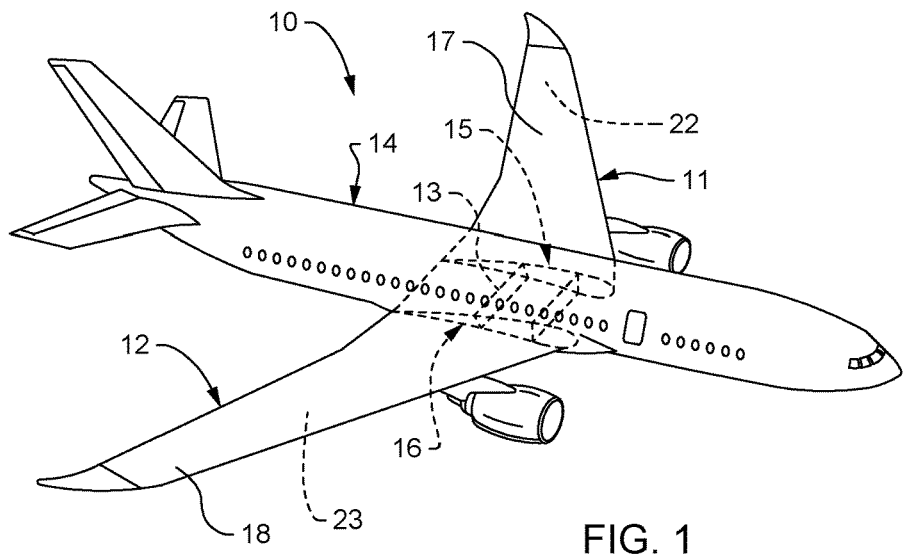
FIG. 1 is a perspective view of an aircraft.

FIG. 1 provides a perspective view of an aircraft 10. The embodiments of this disclosure relate to fasteners used to secure components of the aircraft 10 together, and more specifically to the encapsulation, covering, embedding or encasing of such fasteners in an insulating sealant. However, the disclosed embodiments may be employed to form enclosures for surrounding other types of fasteners disposed in a confined space that need to be covered, encapsulated, encased or embedded in a sealant.

The aircraft 10 includes wings 11, 12 disposed on either side of and connected to a central wing box 13 that extends through the fuselage 14 of the aircraft 10. The wings 11, 12 connect to the fuselage 14 and to the central wing box 13 at the side of body joints 15, 16 respectively. The wings 11, 12 each include outer skins, including upper skins 17, 18 and lower skins 22, 23 respectively.

While various spatial and directional terms, such as top, bottom, lower, upper, mid, lateral, horizontal, vertical, front, rear and the like may be used to describe embodiments disclosed herein, it is understood that such terms are used with respect to the orientation shown in the drawings. The orientations may be inverted, rotated or otherwise changed such that an upper portion becomes a lower portion and vice versa, and horizontal becomes vertical and the like.

Further, for purposes of this disclosure, the terms fastener, part of a fastener or portion of a fastener refer to the fasteners that connect the wing skins 17, 18, 22, 23 to the fuselage 14 or to a connecting structure such as a side of body chord 25 (FIGS. 5-6) and further that extend at least partially into spaces provided in the wings 11, 12 that may serve as fuel tanks. The sealant containment assemblies and methods of embedding fasteners disclosed herein are not limited to aircraft applications, but are applicable to other situations where fasteners or portions of fasteners are disposed within confined spaces that need to be embedded, covered or sealed, with or without the need for electrical insulation.

Figure 5:
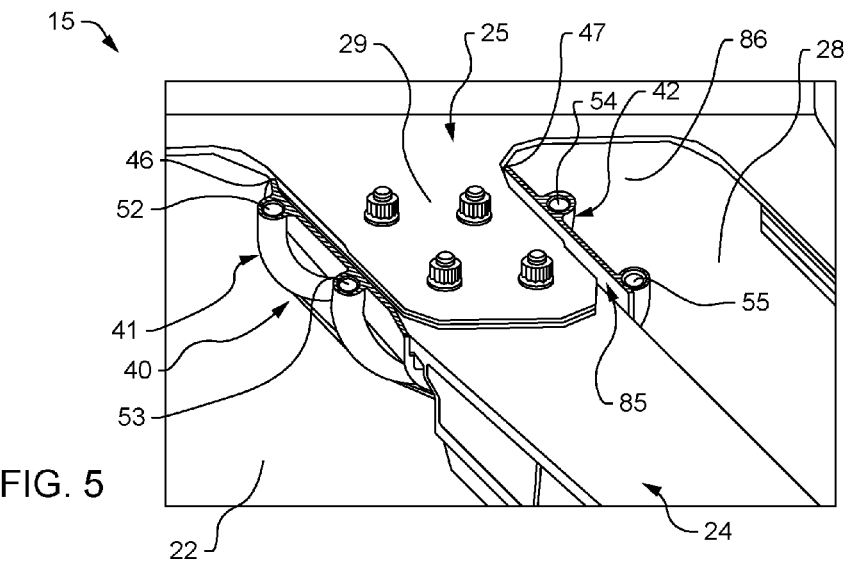
FIG. 5 is a perspective view illustrating the sealant containment assembly of FIG. 2 installed between two (upper and lower) plates of a side of body chord and between a stringer and vertically-oriented wall of the side of body chord thereby enclosing fasteners used to secure the skin of the wing of the aircraft to the side of body chord.
Figure 6:
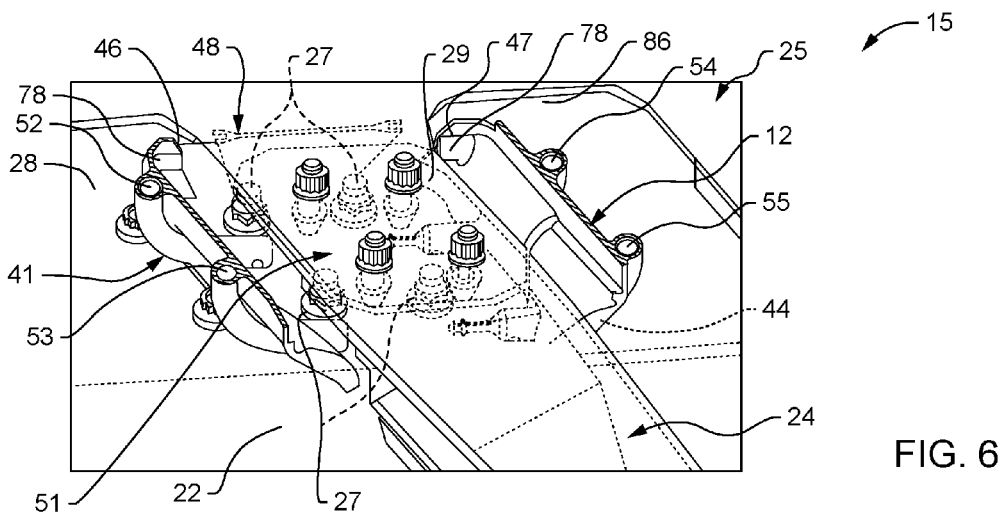
FIG. 6 is a perspective and exploded view of the sealant containment assembly of FIGS. 2 and 5 that illustrates the ease of which the sealant containment assembly may be installed between the side of body chord and the stringer as illustrated in FIG. 5.

Various fasteners secure the upper skins 17, 18 and lower skins 22, 23 to the central wing box 13 and fuselage 14 at the side of body joints 15, 16 respectively. Further, while the spaces between the upper skins 17, 18 and lower skins 22, 23 of the wings 11, 12 accommodate various structural components such as the stringer 24 and side of body chord 25 as shown in FIGS. 5-6, the spaces between the upper skins 17, 18 and lower skins 22, 23 of the wings 11, 12 may also accommodate fuel. Accordingly, any fasteners used to connect the uppers skins 17, 18 or lower skins 22, 23 to the central wing box 13 and/or fuselage 14 via a side of body chord 25 (or other structure) require encasement in an insulating sealant. The insulating sealant prevents an electrical discharge in the event of a lightning strike to the aircraft 10.

Specifically, as shown in FIG. 6, various types of fasteners 27 secure the lower skin 22 of the wing 11 to the first plate 28 of the side of body chord 25. The side of body chord 25 also includes a second plate 29 that connects to the stringer 24 but not by fasteners that pass through the upper skin 17 or lower skin 22. Thus, only the fasteners 27 that pass through the upper skins 17, 18 or lower skins 22, 23 and at least partially into confined spaces between the upper skin 17 and lower skin 22 or between the upper skin 18 and lower skin 23 need to be encased or encapsulated in insulating sealant to prevent an electrical discharge in the event of a lightning strike to the aircraft 10.

Figure 2:
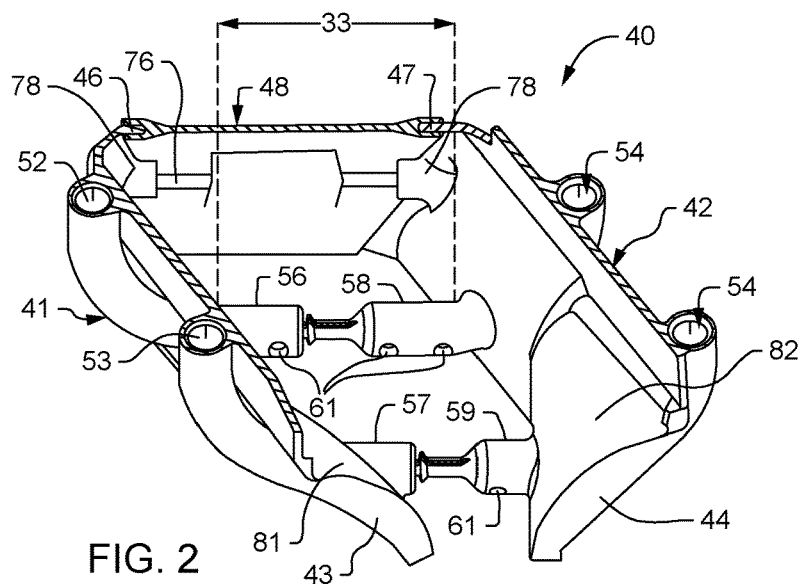
FIG. 2 is a perspective view of one disclosed sealant containment assembly.

FIG. 2 illustrates one disclosed sealant containment assembly 40. The sealant containment assembly 40, in this disclosed embodiment, includes three molded parts although two-part assemblies are available as discussed below and are considered to be within the scope of this disclosure. The sealant containment assembly 40 encloses the fasteners 27 that extend through a first surface, such as the first plate 28 of the side of body chord 25 as illustrated in FIGS. 5-6. The first surface or first plate 28 is spaced apart from an opposing second surface or second plate 29 and the first and second surfaces as represented by the first and second plates 28, 29 engage a structural member, such as the stringer 24.

Referring to FIGS. 2 and 5, the sealant containment assembly 40 comprises a first containment member 41 that extends between the first and second surfaces or between the first and second plates 28, 29. The sealant containment assembly 40 also includes a second containment member 42 that also extends between the first and second surfaces or between the first and second plates 28, 29. As shown in FIG. 6, the fasteners 27 or portions of the fasteners 27 that need to be encased or embedded in sealant are disposed between the first and second containment members 41, 42.

The first and second containment members 41, 42 each comprise structure-engaging ends 43, 44 respectively for engaging the structural member which, in the illustrated embodiment, is the stringer 24 as shown in FIG. 5. The first and second containment members 41, 42 also include enclosure ends 46, 47 for coupling the first and second containment members 41, 42 together with the fasteners 27 disposed between the structural member or stringer 24 and the enclosure ends 46, 47. In the embodiment illustrated in FIGS. 2 and 6, the enclosure ends 46, 47 of the first and second containment members 41, 42 are coupled together by an alignment member 48, which will be discussed in greater detail below in connection with FIG. 4. However, the enclosure ends 46, 47, in other embodiments, couple together more directly thereby enabling a two-piece assembly as opposed to the illustrated three-piece sealant containment assembly 40 of FIGS. 2-6. As illustrated in FIGS. 5-6, the sealant containment assembly 40 encloses the fasteners 27 (FIG. 6) within a confined space 51 (FIG. 6) defined by the first and second containment members 41, 42, the first and second plates 28, 29 (or first and second surfaces), the structural member or stringer 24 and the connected enclosure ends 46, 47 which, in the illustrated embodiment, are coupled together by the alignment member 48.

Figure 3:
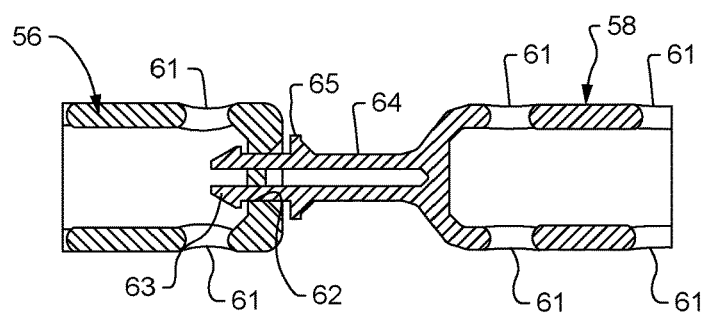
FIG. 3 is a partial sectional view taken substantially along line 3-3 of FIG. 2 and illustrating the male/female connection between two distribution passageways of two sealant containment members.

In the illustrated embodiment, at least one of the first and second containment members 41, 42 include at least one injection port 52-55 disposed outside of the confined space 51 and that is in communication with at least one distribution passageway 56-59 disposed inside the confined space 51. The at least one distribution passageway 56-59 comprises at least one distribution port 61 (FIG. 3) for distributing sealant within the confined space 51. In the illustrated embodiment, both the first and second containment members 41, 42 include injection ports 52-53 and 54-55 respectively that are disposed outside of the confined space 51 and that are in communication with the distribution passageways 56-57 and 58-59 respectively, each of which include at least one distribution port 61, and each of which are disposed inside the confined space 51. Also, in the illustrated embodiment, the distribution passageways 56, 57 of the first containment member 41 connect to the distribution passageways 58-59 of the second containment member 42. In other embodiments, both sets of distribution passageways 56, 58 and 57, 59 may not be connected but only one set of distribution passageways 56, 58 or 57, 59 are connected. FIG. 3 illustrates the connection between the distribution passageways 56, 57 of the first containment member 41 and the distribution passageways 58, 59 of the second containment member 42 respectively. In FIG. 3, the distribution passageways 56, 58 are connected together by a male/female connection such as the employment of a female end opening 62 that receives a barbed distal end 63 of a tube 64 that extends outward from the distribution passageway 58. The tube 64 may include a flange 65 as a stop. This disclosure is not limited to the male/female connection illustrated in FIGS. 2-3. Other snap-fit-type, interlock-type, frictional-fit-type, etc. connections are available and will be apparent to those skilled in the art.

Figure 4:
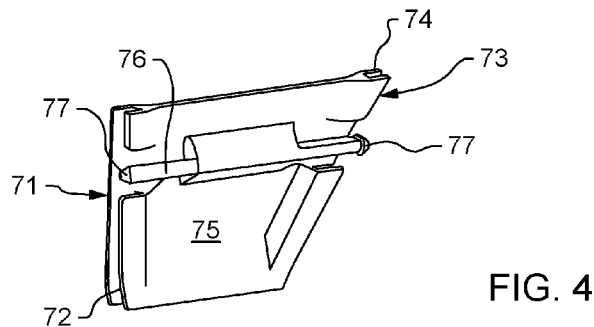
FIG. 4 is a perspective view of the alignment member of the sealant containment assembly shown in FIG. 2.

In a further refinement, shown in FIG. 4, the alignment member 48 includes a first end 71 that forms a groove 72 while the enclosure end 46 of the first containment member 41 (FIG. 2) forms a tongue thereby providing a tongue-in-groove connection between the first end 71 of the alignment member 48 and the enclosure end 46 of the first containment member 41. Similarly, the alignment member 48 as shown in FIG. 4 includes a second end 73 that similarly forms a groove 74 while the enclosure end 47 (FIG. 2) of the second containment member 42 forms a tongue for a tongue-in-groove connection between the second end 73 of the alignment member 48 and the enclosure end 47 of the second containment member 42. In an additional or alternative refinement, the alignment member 48 connects to the first and second containment members 41, 42 with male/female connectors. More specifically, the alignment member 48 comprises an inner wall 75 (FIG. 4) that faces the confined space 51 (FIG. 6). The inner wall 75 connects to a rod 76 having oppositely directed or opposing barbed ends 77. Referring back to FIG. 2, the first and second containment members 41, 42 also each comprise an inner wall 81, 82 respectively that each connect to a socket 78 extending outward from its respective inner wall 81, 82. Each socket 78 receives one of the barbed ends 77 of the rod 76 (FIG. 4) to connect the alignment member 48 to the first and second containment members 41, 42.

Thus, the sealant containment assembly 40 provides an enclosure for containing sealant for encasing, embedding or encapsulating fasteners 27 disposed in a confined space 51, such as fasteners 27 used to secure a wing 11, 12 to a fuselage 14 of an aircraft 10. In such an application, the fasteners 27 are disposed between two surfaces or two plates 28, 29 disposed inside one of the wings 11, 12 and between a structural member, such as a stringer 24 of one of the wings 11, 12 and the fuselage 14 of the aircraft 10. The sealant containment assembly 40 comprises a first containment member 41 that extends between the two surfaces or plates 28, 29 and a second containment member 42 that extends between the two surfaces or plates 28, 29 with the fasteners 27 disposed between the first and second containment members 41, 42. The first and second containment members 41, 42 each comprise structure-engaging ends 43, 44 for engaging the structural member or stringer 24 and enclosure ends 46, 47 that are connected or coupled together by an alignment member 48 that extends between the two surfaces or two plates 28, 29 with the fasteners 27 disposed between the structural member or stringer 24 and the alignment member 48. As a result, the sealant containment assembly 40 encloses the fasteners 27 within a confined space 51 (FIG. 6) defined by the first and second containment members 41, 42, the first and second surfaces or plates 28, 29, the structural member or stringer 24 and the alignment member 48. At least one of the first and second containment members 41, 42 comprises at least one injection port 52-55 disposed outside of the confined space 51 and that is in connection with at least one distribution passageway 56-59 that comprises at least one distribution port 61 disposed inside the confined space 51. As noted above, the distribution passageways 56, 58 and 57, 59 may be connected using a variety of mechanisms, one of which is the male/female connection illustrated in FIG. 3. The first end 71 and the second end 73 of the alignment member 48 may form a tongue-in-groove connection with the enclosure ends 46, 47 of the first and second containment members 41, 42 respectively. Further, as illustrated in FIGS. 2 and 4, additional male/female connections between the alignment member 48 and the first and second containment members 41, 42 are optionally provided. For example, a rod 76 with opposing barbed ends 77 mounted to the inner wall 75 of the alignment member 48 connects with sockets 78 disposed at the enclosure ends 46, 47 of the first and second containment members 41, 42 respectively.

The injection ports 52-55 facilitate the injection sealant into the confined space 51 when the sealant containment assembly 40 is installed as illustrated in FIG. 5. To vent the confined space 51 during the injection of the sealant, one or more gaps may be provided between the first and second containment members 41, 42 and one of the plates 28, 29 or between the alignment member 48 and one of the plates 28, 29. Such a gap, like the gap 85 shown in FIG. 5 also provides a visual indication to the operator when the confined space 51 is filled with the insulating sealant.

Various methods for encasing or embedding fasteners 27 in sealant are disclosed. The fasteners 27 may be used to secure the skins 17, 18, 22, 23 of an aircraft 10 to a side of body chord 25 of an aircraft 10. The side of body chord 25 may include a first plate 28 and a second plate 29 that extend outward from a wall 86. The fasteners 27 connect the skin 22 to the first plate 28 as shown in FIGS. 5-6 with portions of the fasteners 27 disposed between the two plates 28, 29 and between the wall 86 of the side of body chord 25 and the structural member or stringer 24 of one of the wings 11, 12. The method comprises providing a first containment member 41 configured to extend between the first and second plates 28, 29 and providing a second containment member 42 configured to extend between the first and second plates 28, 29. The first and second containment members 41, 42 each comprise structure-engaging ends 43, 44 for engaging the structural member or stringer 24 of one the wings 11 or 12. The first and second containment members 41, 42 also each include enclosure ends 46, 47 respectively for connecting the first and second containment members 41, 42 together in a spaced-apart relationship as illustrated in FIGS. 2 and 5. At least one of the first and second containment members 41, 42 comprises at least one injection port 52-55 that is in communication with at least one distribution passageway 56-59 that comprises at least one distribution port 61. The method further includes providing an alignment member 48 configured to extend between the first and second plates 28, 29 and further configured to align and connect the enclosure ends 46, 47 of the first and second containment members 41, 42. The method further includes connecting the first and second containment members 41, 42 to the alignment member 48 and engaging the structure-engaging ends 43, 44 of the first and second containment members 41, 42 with the structural member or stringer 24 to provide a confined space 51 between the first and second containment members 41, 42, between the first and second plates 28, 29 and between the structural member or stringer 24 and the alignment member 48. Further, the method comprises injecting sealant into the at least one injection port 52-55 and out through the at least one distribution port 61 and into the confined space 51. As shown in the drawings, the first and second containment members 41, 42 each comprise at least one injection port 52-55 disposed outside of the confined space 51 that is in communication with at least one distribution passageway 56-59 that comprises at least one distribution port 61 disposed inside the confined space 51. Such a method further comprises connecting the at least one distribution passageway 56, 57 of the first containment member 41 to the at least one distribution passageway 58, 59 of the second containment member 42.

Techniques for forming the first and second containment members 41, 42 and the alignment member 48 include 3D printing or additive manufacturing. Because stringer joints are highly customized based on geometry and loads, the use of 3D printing or additive manufacturing allows the seal containment assembly 40 to be custom fit without the need to design and construct special tooling. Potential 3D printing or additive manufacturing techniques include, but are not limited to selective laser sintering (SLS) and fused deposition modelling (FDM). Suitable materials for forming first and second containment members 41, 42 and the alignment member 48 include various thermoplastics. In one or more embodiments, one suitable thermoplastic is PEKK (polyetherketoneketone). PEKK is particularly suitable for applications where the sealant containment assembly 40 is disposed within a fuel tank of an aircraft 10 because PEKK is compatible with jet fuel. However, manufacturers may employ other polymers or thermoplastics, depending upon the application, as will be apparent to those skilled in the art.

While only certain embodiments have been set forth, alternatives and modifications will be apparent from the above description to those skilled in the art. Further, aspects of different embodiments may be combined or substituted with one another. These and other alternatives are considered equivalents and within the spirit and scope of this disclosure and the appended claims.

The invention claimed is:

1. A sealant containment assembly for use with fasteners that extend through a first surface, the first surface being spaced apart from an opposing second surface and the first and second surfaces engaging a structural member, the sealant containment assembly comprising:
   a first containment member sized for insertion between the first and second surfaces, the first containment member including a structure-engaging end, configured to engage the structural member, and an enclosure end, and
   a second containment member sized for insertion between the first and second surfaces, the second containment member including a structure-engaging end, configured to engage the structural member, and an enclosure end, wherein the enclosure end of the second containment member is configured to couple to the enclosure end of the first containment member,
   wherein the first and second containment members are further configured so that, when the first and second containment members are placed on opposite sides of the fasteners and the enclosure end of the first containment member is coupled to the enclosure end of the second containment member, the first and second containment members cooperate with the first surface, the second surface, and the structural member to form a confined space surrounding the fasteners, and
   wherein at least one of the first and second containment members includes at least one injection port disposed outside of the confined space that is in communication with at least one distribution passageway disposed inside the confined space, the at least one distribution passageway comprising at least one distribution port for distributing sealant within the confined space.

2. The sealant containment assembly of claim 1, in which at least part of one of the first and second containment members is further configured to form a gap relative to at least one of the first and second surfaces to vent the confined space during injection of sealant through the at least one injection port.

3. The sealant containment assembly of claim 1 wherein each of the first and second containment members include at least one injection port disposed outside of the confined space that is in communication with at least one distribution passageway comprising at least one distribution port disposed inside the confined space.

4. The sealant containment assembly of claim 3 wherein the distribution passageway of the first containment member connects to the distribution passageway of the second containment member.

5. The sealant containment assembly of claim 4 wherein the distribution passageways of the first and second containment members are connected by a male/female connection.

6. The sealant containment assembly of claim 1 wherein the enclosure ends of the first and second containment members are connected by an alignment member sized for insertion between the first and second surfaces.

7. The sealant containment assembly of claim 6 wherein the alignment member includes a first end that forms a tongue in groove connection with the enclosure end of the first containment member and the alignment member includes a second end that forms a tongue in groove connection with the enclosure end of the second containment member.

8. The sealant containment assembly of claim 6 wherein the alignment member is connected to the first and second containment members with male/female connectors.

9. The sealant containment assembly of claim 6 wherein the alignment member comprises an inner wall that faces the confined space and that connects to a rod having opposing barbed ends, and the first and second containment members each comprise an inner wall having a socket extending outward from the inner wall, each socket receiving one of the barbed ends of the rod to connect the alignment member to the first and second containment members.

10. A sealant containment assembly for use with fasteners used to secure a wing to a fuselage of an aircraft, wherein the fasteners are disposed between two surfaces disposed inside the wing and between a structural member of the wing and the fuselage of the aircraft, the sealant containment assembly comprising:
- a first containment member sized for insertion between the two surfaces, the first containment member including a structure-engaging end, configured to engage the structural member, and an enclosure end, and
- a second containment member sized for insertion between the two surfaces, the second containment member including a structure-engaging end configured to engage the structural member and an enclosure end, wherein the enclosure end of the second containment member is configured to couple to the enclosure end of the first containment member,
- wherein the first and second containment members are further configured so that, when the first and second containment members are placed on opposite sides of the fasteners and the enclosure end of the first containment member is coupled to the enclosure end of the second containment member, the first and second containment members cooperate with the two surfaces and the structural member to form a confined space surrounding the fasteners, and
- wherein at least one of the first and second containment members comprises at least one injection port disposed outside of the confined space that is in communication with at least one distribution passageway disposed inside the confined space, the distribution passageway comprising at least one distribution port for distributing sealant within the confined space.

11. The sealant containment assembly of claim 10 wherein the alignment member includes a first end that forms a tongue in groove connection with the enclosure end of the first containment member and the alignment member includes a second end that forms a tongue in groove connection with the enclosure end of the second containment member.

12. The sealant containment assembly of claim 10 wherein the alignment member is connected to the first and second containment members with male/female connectors.

13. The sealant containment assembly of claim 10, in which at least part of one of the first and second containment members is further configured to form a gap relative to at least one of the two surfaces to vent the confined space during injection of sealant through the at least one injection port.

14. The sealant containment assembly of claim 10 wherein the alignment member comprises an inner wall that faces the confined space and that connects to a rod having opposing barbed ends, and the first and second containment members each comprise an inner wall having a socket extending outward from the inner wall, each socket receiving one of the barbed ends of the rod to connect the alignment member to the first and second containment members.

15. The sealant containment assembly of claim 10 wherein each of the first and second containment members include at least one injection port disposed outside of the confined space that is in communication with at least one distribution passageway comprising at least one distribution port disposed inside the confined space.

16. The sealant containment assembly of claim 15 wherein the distribution passageway of the first containment member connects to the distribution passageway of the second containment member.

17. The sealant containment assembly of claim 15 wherein the distribution passageways of the first and second containment members are connected by a male/female connection.

18. A method for embedding fasteners in sealant wherein the fasteners are used to secure a skin of a wing of an aircraft to a side of body chord of the aircraft, the side of body chord including a first plate and a second plate that extend outward from a wall, the fasteners connecting the skin to the first plate with portions of the fasteners disposed between the two plates and between the wall of the side of body chord and a structural member of the wing, the method comprising:
- providing a first containment member configured to extend between the first and second plates and a second containment member configured to extend between first and second plates, the first and second containment members each comprising structure-engaging ends for engaging the structural member of the wing and enclosure ends for connecting the first and second containment members together in a spaced-apart relationship, at least one of the first and second containment members comprising at least one injection port that is in communication with at least one distribution passageway that comprises at least one distribution port;
- providing an alignment member configured to extend between the first and second plates and further configured to align and connect the enclosure ends of the first and second containment members together;
- connecting the first and second containment members to the alignment member and engaging the structure-engaging ends of the first and second containment members with the structural member to provide a confined space between the first and second containment members, between the first and second plates and between the structural member and the alignment member; and
- injecting sealant into the at least one injection port and out through the at least one distribution port and into the confined space.

19. The method of claim 18 wherein each of the first and second containment members comprise at least one injection port disposed outside of the confined space that is in communication with at least one distribution passageway comprising at least one distribution port disposed inside the confined space, and the method further comprises
- connecting the at least one distribution passageway of the first containment member to the at least one distribution passageway of the second containment member.

20. The method of claim 18 wherein the providing of first and second containment members and the providing of the alignment member comprises fabricating the first and second containment members and the alignment member using 3D printing.

* * * * *